United States Patent [19]

Iketani et al.

[11] Patent Number: 5,394,275
[45] Date of Patent: Feb. 28, 1995

[54] APPARATUS FOR SELECTIVELY RECORDING AND REPRODUCING TWO VIDEO SIGNALS HAVING DIFFERENT AMOUNTS OF DATA IN EACH FRAME

[75] Inventors: Akira Iketani, Higashiosaka; Chiyoko Matsumi, Suita; Tatsuro Juri, Osaka, all of Japan

[73] Assignee: Matsushita Electric Industrial Co., Ltd., Osaka, Japan

[21] Appl. No.: 722,549

[22] Filed: Jun. 26, 1991

[30] Foreign Application Priority Data

Jun. 27, 1990 [JP] Japan .................................. 2-168711
Aug. 16, 1990 [JP] Japan .................................. 2-216881

[51] Int. Cl.$^6$ ............................................... H04N 5/78
[52] U.S. Cl. .................................... 360/35.1; 358/335
[58] Field of Search ................. 360/33.1, 35.1, 36.2, 360/60, 63, 10.1, 78.07, 78.14; 358/310, 328, 335, 322, 142, 143, 181

[56] References Cited

U.S. PATENT DOCUMENTS

| | | | |
|---|---|---|---|
| 4,456,930 | 6/1984 | Hashimoto | 358/328 |
| 4,520,401 | 5/1985 | Takahashi et al. | |
| 4,862,292 | 8/1989 | Enari et al. | |
| 4,864,424 | 9/1989 | Ochi et al. | 358/328 |
| 4,963,991 | 10/1990 | Honjo | |
| 5,065,259 | 11/1991 | Kubota et al. | 358/335 |

FOREIGN PATENT DOCUMENTS

| | | |
|---|---|---|
| 0199563A3 | 10/1986 | European Pat. Off. |
| 0337650A1 | 4/1989 | European Pat. Off. |
| 0415699A2 | 3/1991 | European Pat. Off. |
| 57-181461 | 11/1982 | Japan |
| 58-143410 | 8/1983 | Japan |
| 60-133573 | 7/1985 | Japan |
| 60-193138 | 10/1985 | Japan |
| 62-78779 | 4/1987 | Japan |
| 63-98870 | 4/1988 | Japan |
| 1191304 | 8/1989 | Japan |
| 2-21405 | 1/1990 | Japan |
| 2-108279 | 4/1990 | Japan |

OTHER PUBLICATIONS

"LSIs for Digital Signal Processing Based on a PCM Standard Format", Hirota et al., J. Audio Eng. Soc., vol. 31, No. 7, Jul./Aug. 1983, pp. 523–537.

*Primary Examiner*—David C. Nelms
*Assistant Examiner*—Que T. Le
*Attorney, Agent, or Firm*—Wenderoth, Lind & Ponack

[57] ABSTRACT

Two, HD and SD, signals are arranged so as to be identical to each other in the recorded form on a recording medium. Reciver circuits, encoder circuits, and a recording circuit for SD signals are provided. Also, a receiver circuit, an encoder circuit, and a recording circuit for HD signals are provided. In addition, a circuit is provided for identifying whether the input signal is an SD or HD signal. Accordingly, both the HD and SD signals can be recorded using one single digital VCR while no further hardware is involved. Simultaneous recording of a plurality of SD signals and high-speed dubbing of SD signals may be executed using an HD signal processing circuit.

2 Claims, 6 Drawing Sheets

APPARATUS FOR SELECTIVELY RECORDING AND REPRODUCING TWO VIDEO SIGNALS HAVING DIFFERENT AMOUNTS OF DATA IN EACH FRAME

BACKGROUND OF THE INVENTION

1. Field of the Invention

The present invention relates to an apparatus for recording and playing back of two digital video signals having different amounts of data in each frame.

2. Description of the Prior Art

As high definition video signals (referred to as HD signals hereinafter) are now proved advantageous, the development of HDVCRs for recording HD signals have been accelerated. Such HDVCRs are however designed for analog recording and the form of record on a tape medium is different between the HD signals and the existing standard video signals (referred to as SD signals hereinafter). Hence, there is no way to process both the HD and SD signals with the same circuit. Conventional VCRs for digital recording (referred to as DVCRs) are substantially prepared for broadcast service with either HD and SD signals. Also, each DVCR is separately designed for processing HD or SD signals thus having no compatibility. Although such professional-use DVCRs allow only one type of signal, HD or SD signals, to be recorded and played back, they are used for broadcast service and will be accepted in spite of their inability for processing both the HD and SD signals with the same circuitry.

However, home-use DVCRs which will before long be introduced in the market never appreciate the foregoing drawback that each type signal is processed by its specific DVCR. In particular, the drawback will be emphasized in the respects of overall cost, installation space, and operational difficulty. As understood, none of the conventional DVCRs failing to have a compatible arrangement for the recording of both HD and SD signals is eligible for use as a home-use DVCR. Also, such inability of a conventional DVCR leads to discourage improvements in its performance. If each HD signal carries data as much as 4 times the data of an SD signal, one DVCR which can process HD signals for recording (referred to as an HDDVCR) will be capable of processing 4 times the data that can be processed by a typical SD signal DVCR (referred to as an SDDVCR). Unfortunately, the conventional HDDVCR has no capability for processing SD signals and cannot appropriate its bulk signal processing ability to the recording of more SD signals. In other words, the conventional HDDVCR fails to improve its operational capability.

SUMMARY OF THE INVENTION

It is an object of the present invention to provide an improved digital VCR in which both the HD and SD signals can be processed for record/playback operation so that the drawback of the conventional DVCR which allows no compatible signal operation is eliminated. More specifically, according to the present invention, a plurality of SD signals can be recorded at the same time using a single HDDVCR and high-speed dubbing of SD signals will also be feasible. Those advantages are realized by establishing the two, physical and logical, formats of a magnetization pattern on a discrete band (referred to as a track) developed on a magnetic recording tape for use with both the HD and SD signals. The physical format depends on the length of a track and an angle to the running direction of a tape. The logical format is determined by an alignment of recorded data along the track. It is thus satisfied by, as each track consists of a plurality of data blocks and each block contains a multiplicity of data groups, making the number of blocks and the number of data groups per block equal. The recorded data is determined to be either an HD signal or an SD signal by its identification code recorded on the tape.

It is understood that the data of one HD signal required for developing one frame of picture is about 4 times the data of one SD signal. Then, if 10 tracks are needed for recording the SD signal, 40 tracks will be needed for recording the HD signal. For use with a home DVCR, a redundancy of the picture data is removed by a conventional technique known as high efficiency encoding in order to provide a practical length of record time and thus, the overall data to be recorded will be reduced. At the time, the amount of data redundancy becomes different between the, HD and SD signals and the record data of the HD signal is equal to two or three times that of the SD signal. Accordingly, while the data of the SD signal is recorded onto 10 tracks, the data of the HD signal needs 20 or 30 tracks for recording. Now, there is prepared a signal processing circuit in which one frame of picture is reproduced from 10-track data of the SD signal and 20- or 30-track data of the HD signal with reference to identification codes of the signals. In common, if the number of tracks needed for recording the SD signals is Y, the number X of tracks for recording the HD signal becomes greater than Y.

More details of the present invention will be described with relation to the foregoing aspects. A first embodiment of the present invention is provided in which for the high-speed processing of HD signals, an input video signal is divided into N of signal blocks which are then processed in parallel. Because an N of video signal processing circuits are arranged in parallel, both the HD and SD signals can equally be processed when the data of each signal block of the HD signal is equivalent to the data SD signal. By switching an HD signal block to an SD signal or vice versa, both the HD signal and the N of the SD signals can be recorded with the same circuit arrangement. For playback, the recorded signals processed with the circuitry arrangement of the first embodiment of the present invention will be reproduced by a reverse of the procedure of the first embodiment.

A second embodiment of the present invention is provided in which the speed of signal processing is fast enough to process the HD signal with a one-route circuit arrangement. A succession of N SD signals combined in series for carrying a total amount of data equal to the data of an HD signal is fed to a downstream circuit, whereby the data of an input video signal will not be greatly deteriorated and both the HD and SD signals will be processed in the same manner. More particularly, while the HD signal is directly transferred for recording, the N of SD signals are transferred as a unit so that they can equally be recorded. For playback, the recorded signals processed with the forgoing arrangement will be reproduced by a reverse of the procedure of the second embodiment of the present invention. As set forth above, the second embodiment allows a plurality of the SD signals to be simultaneously recorded as well as one HD signal and one SD signal. Accordingly, the novel arrangement of the second embodiment providing higher versatility will contribute to the improvement of an advanced video recording apparatus such as an HDDVCR. Also, it will be used with equal success for transmission of moving picture data of e.g. ISDN.

A third embodiment of the present invention is provided in which as the HD and. SD signals are recorded in the same manner, the SD signal is treated as the HD signal. The SD signal is different from the HD signal only in the number of tracks for reproducing one frame of picture. In a specific signal processing where no reproduction of video image is involved, e.g. dubbing, the type of data signal, whether an HD signal or an SD signal, is immaterial. Hence, during dubbing, different types or one type of the SD signal can be processed as one HD signal at once for transfer of data of a multiplicity of pictures. For example, each HD signal processing circuit is capable of processing data 4 times that of an SD signal processing circuit and thus, the SD signals reproduced at a speed of 4 times the normal speed can be processed by the HD signal processing circuit. As the result, high-speed dubbing of SD signals will be feasible according to the present invention.

DESCRIPTION OF PREFERRED EMBODIMENTS

Embodiment 1

Figure 1:
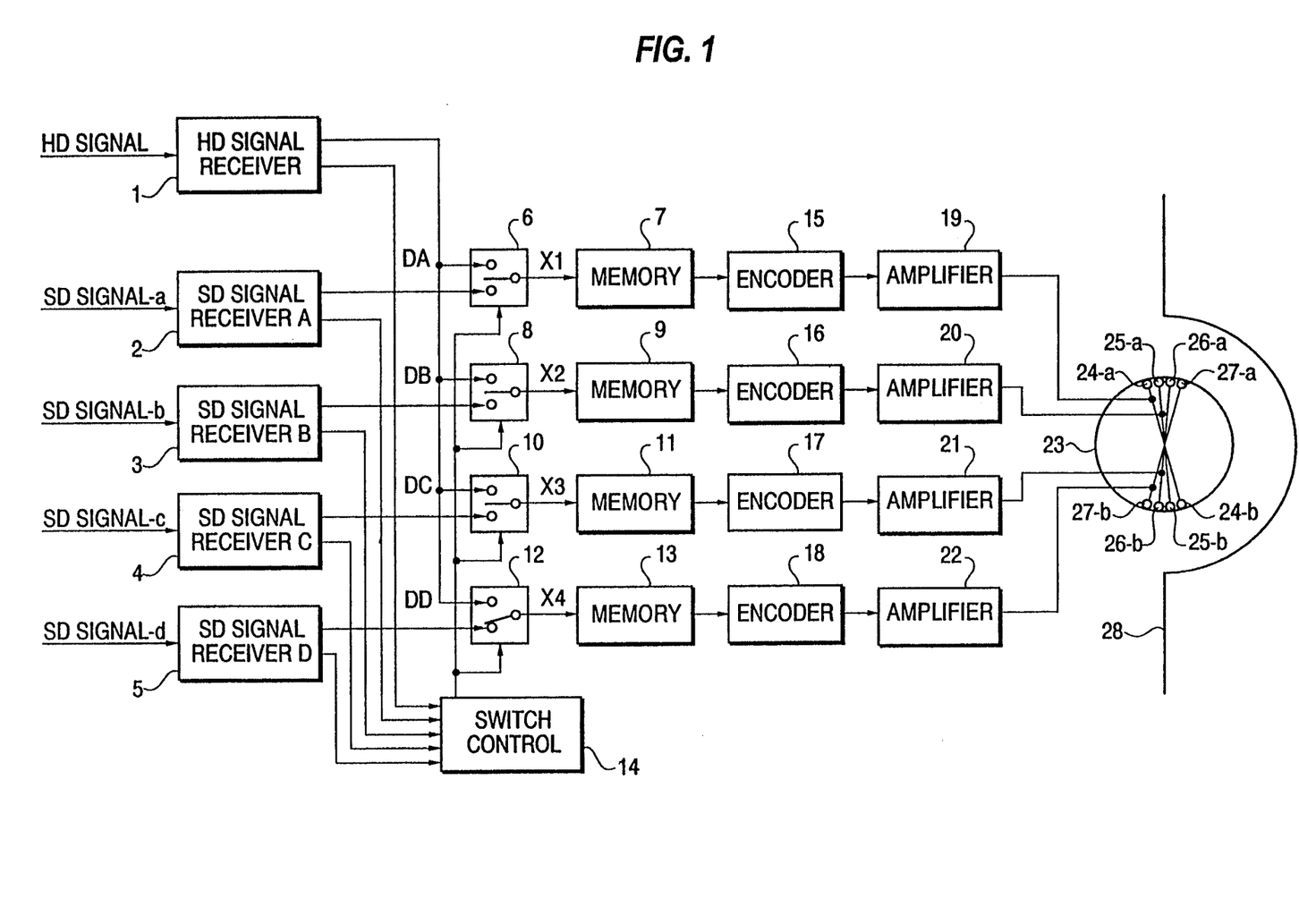
FIG. 1 is a block diagram showing a recording circuit of a first embodiment of the present invention.

FIG. 1 shows a first embodiment of the present invention in which for ease of description, HD signals are fed through one channel while SD signals are fed through four channels. As shown, an HD signal receiver circuit 1 receives an HD signal and delivers a digital form of the HD signal. Similarly, four SD signal receiver circuits 2, 3, 4, and 5 when receiving SD signals deliver digital forms DA, DB, DC, and DD of the SD signals respectively. Also, four corresponding switches 6, 8, 10, and 12 are provided for receiving outputs of the HD signal receiver circuit 1 and outputs from their respective SD signal receiver circuits 2, 3, 4, and 5.

It is assumed that the data for one picture frame carried on the HD signal is expressed as 4I which consists of four I-bit segments X1, X2, X3, and X4. For recording of only the HD signal, the switch 6 passes X1 of the HD signal to a memory circuit 7 where it is temporarily stored. After passing X1, the switch 6 becomes disconnected to allow no further storage action until the next X1 is input. Similarly, the other three switches 8, 10, and 12 pass X2, X3, and X4 of the HD signal to memory circuits 9, 11, and 13 respectively and become disconnected to allow no further storage action until the next X2, X3, and X4 are input. Hence, each pair of the switch 6 and the memory circuit 7, the switch 8 and the memory circuit 9, the switch 10 and the memory circuit 11, and the switch 12 and the memory circuit 13 constitutes a selector means in the embodiment.

The four Switches 6, 8, 10, and 12 are controlled by a switch controller circuit 14. More particularly, the switch controller circuit 14 determines the switching action of the switches 6, 8, 10, and 12 according to a recording mode, e.g. recording of one-channel HD signals, one-channel SD signals, or more-than-one-channel SD signals, arbitrarily selected by an operator. The switch controller circuit 14 hence acts as a switch for standard clock pulses and thus, controls the passage for signal processing depending on a type of the signal to be recorded. The control is carried out with different sync signals for video signals extracted from the input signals at their respective signal receiver circuits 1, 2, 3, 4, and 5. The data stored in the memory circuit 7 is read out at a speed equal to ¼ of the writing speed and is transferred to an encoder circuit 15. More specifically, ¼ of the one-frame data of the HD signal is retrieved during a period of one frame. Accordingly, only after the data stored has all been read out, can X1 of the succeeding frame be input to the memory 7 for storage.

Similarly, the data stored in the memory circuit 9 is read out at a speed equal to ¼ of the writing speed and transferred to an encoder circuit 16. The data stored in the memory circuits 11 and 13 are read out at a speed equal to ¼ of the writing speed and are transferred to encoder circuits 17 and 18 respectively. The encoder circuits 15 to 18 carry out encoding of the data by e.g. error correction coding and modulation. If desired, prior to the error correction coding, a procedure of high efficiency coding in which a redundancy of picture is removed and the amount of data to be recorded is reduced will be performed for increasing the recording time. In every case, outputs from the encoder circuits 15, 16, 17, and 18 are further transferred to amplifiers 19, 20, 21, and 22 respectively and recorded onto a magnetic recording tape 28 through corresponding magnetic heads 24a to 24b, 25a to 25b, 26a to 26b, and 27a to 27b mounted on a rotating cylinder 23. As is understood, the amplifiers 19 to 22 and the magnetic heads 24a to 27b on the rotating cylinder 23 constitute a recording means.

For recording of the SD signals, the switch 6 transmits an output of the SD signal receiver circuit 2 to the memory circuit 7. Similarly, the switches 8, 10, and 12 transmit outputs of the SD signal receiver circuits 3, 4, and 5 to the memory circuits 9, 11, and 13 respectively. As explained previously, the data carried on the SD signal is equivalent to about ¼ the data of the HD signal. Accordingly, the duration for processing four of the SD signals at one time with the memory circuits 7, 9, 11, and 13 and the encoder circuits 15 to 18 becomes equal to the time for recording four segments of the HD signal. Hence, a procedure of recording four of the SD signals simultaneously will be similar to the recording of four segments of the HD signal. Although the number of signal transfer routes in the first embodiment are identical to the number of the input channels for the SD signals, it may be altered for modification. Some or all of the four outputs of the memory circuits 7, 9, 11, and 13 may be combined to have one or two signal transfer routes. Also, the circuit arrangement for recording routes may be determined arbitrarily.

Figure 2:
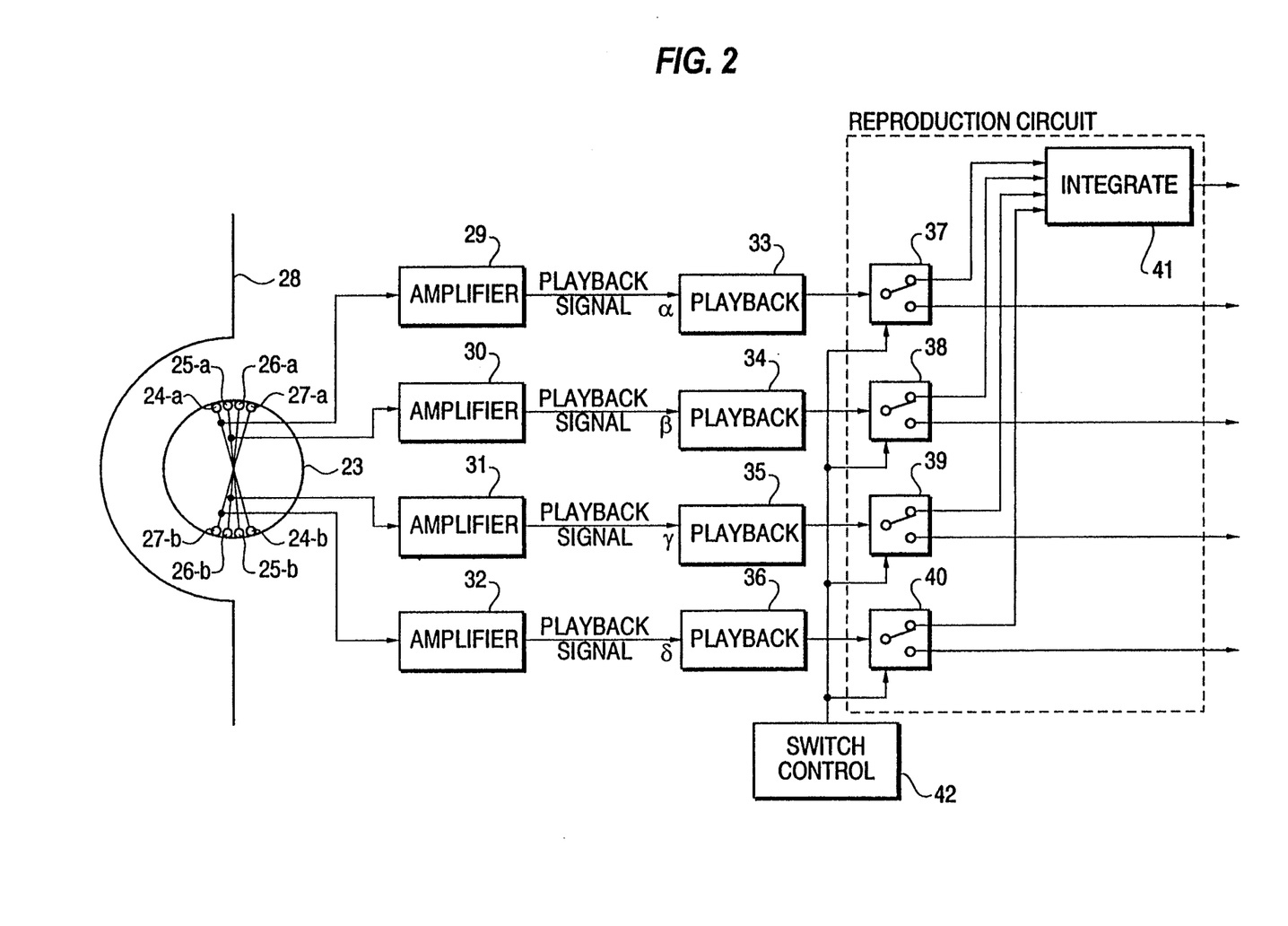
FIG. 2 is a block diagram showing a playback circuit of the first embodiment.

An arrangement of circuits for reproducing the video signals which have been recorded onto the recording tape by the foregoing manner will now be described referring to the block diagram of FIG. 2. As shown, the data on the magnetic tape 28 is retrieved by the magnetic heads 24a to 27b of the rotating cylinder 23 and then, amplified by four amplifiers 29 to 32 into four playback signals α, β, γ, and δ. The four playback signals α, β, γ, and δ are transferred to four playback circuits 33 to 36 respectively where a reverse of the operation of the encoder circuits 15 to 18 is carried out. More particularly, each coded word in the playback signal is decoded to an original data form which is in turn appropriated by error correction. Such a series of routines will be executed by known techniques. If the data has been processed by high efficiency coding during recording, it should be decoded to a video data form at a preparatory stage. When the reproduction data is an HD signal, it decoded components are transmitted across four switches 37 to 40 to an integrating circuit 41 where they are combined into a one-channel HD video signal for output. When the reproduction data are SD signals, they are delivered from their respective playback circuits 33 to 36 through the switches 37 to 40 directly to the outputs.

Identification codes contained in the reproduction data from the playback circuits 33 to 36 are fed to a Switch control circuit 42 where a determination is made as to whether their corresponding reproduction signals are SD or HD signals. The resultant signals are delivered to their respective switches 37 to 40 which in turn transmit the playback signals, if they are HD signal components, from the playback circuits 33 to 36 to the integrating circuit 41 and, if they are SD signals, allow them to pass through directly to the outputs. Hence, the switches 33 to 36, the integrating circuit 41, and the switch control circuit 42 constitute in combination a reproducing means.

Although this embodiment explains the recording of SD video signals from all the four channels, any number out of four channels may arbitrarily be used for the recording of SD signals. For example, recording of the SD signal from one channel is carried out through the SD signal receiver circuit 2, the switch 6, the memory circuit 7, the encoder circuit 15, and the magnetic heads 24a and 24b to the magnetic tape 28 which runs at a speed of ¼ for providing 4 times the recording time of an HD signal. According to the present invention, the potential capability of any HDVCR will be optimized. More particularly, a variety of signals can be recorded and also, the number of SD signals for simultaneous recording and their recording duration will arbitrarily be determined.

Embodiment 2

Figure 3:
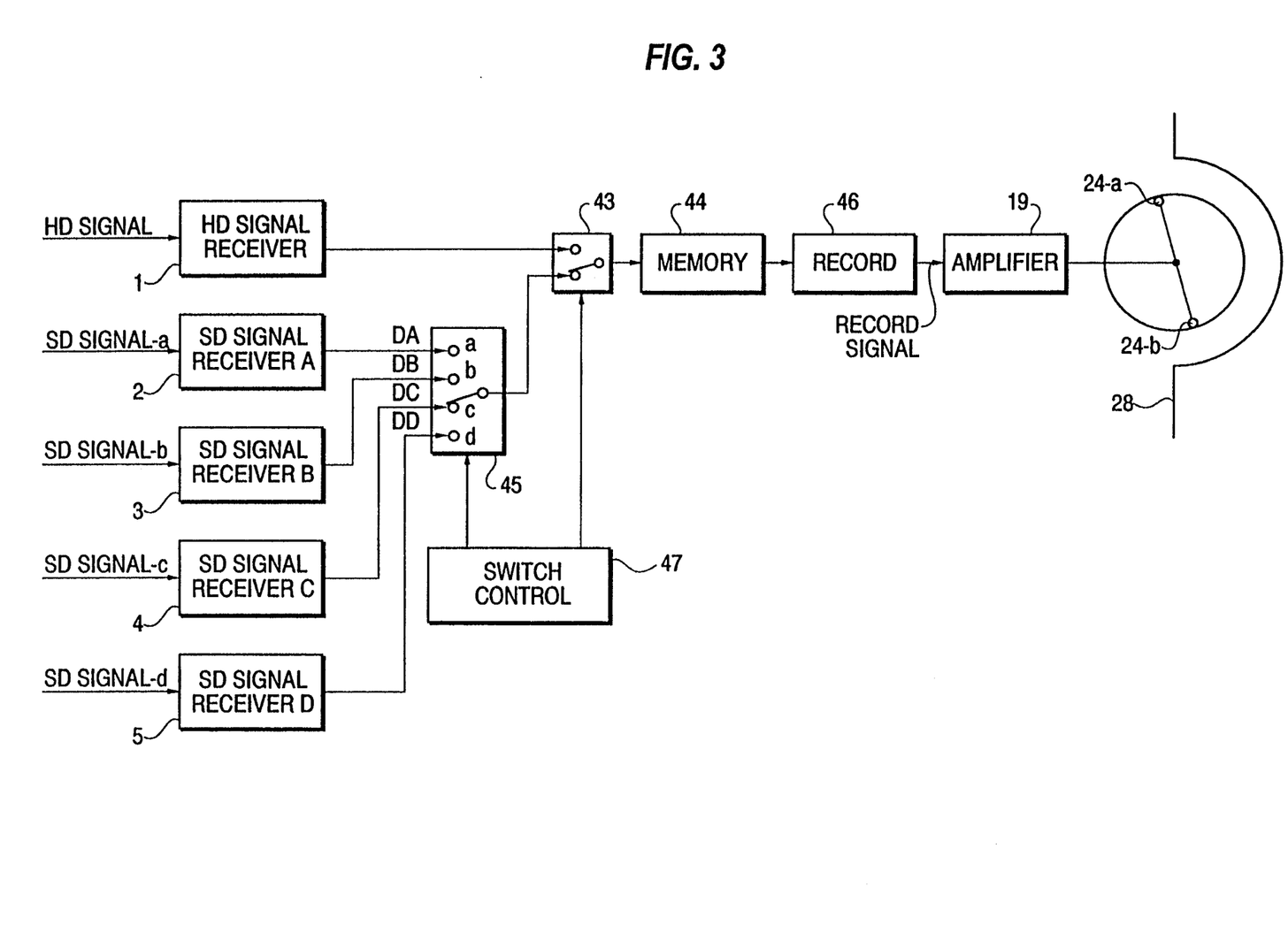
FIG. 3 is a block diagram showing a recording circuit of a second embodiment of the present invention.

FIG. 3 shows a second embodiment of the present invention in which for ease of description, HD signals are fed through one channel while SD signals are fed through four channels. As shown, an HD signal receiver circuit 1 receives an HD signal and delivers a digital form of the HD signal. Similarly, four SD signal receiver circuits 2, 3, 4, and 5 when receiving SD signals deliver digital forms DA, DB, DC, and DD of the SD signals respectively. For the recording of HD signals, the digital HD signal from the HD signal receiver 1 is transmitted though a switch 43 to a memory circuit 44. For recording of SD signals, the digital SD signals DA, DB, DC, and DD from their respective SD signal receivers 2, 3, 4, and 5 are fed to the four inputs 45a to 45d of a switch 45 respectively where each of the input signals associated with a pixel is connected at a speed of 4 times the normal speed for processing an HD signal. The SD digital signals are then delivered in a succession through the switch 43 to the memory circuit 44.

As understood, the data of each HD signal contains more than 4 times the data of an SD signal. Hence, the data of the four SD signals supplied though the two switches 45 and 43 is smaller than that of the HD signal. More particularly, the memory circuit 44 which can hold the data of one HD signal is appropriate for storage of the data of four digital SD signals. Preferably, the retrieval of a group of four SD signals from the memory circuit 44 is conducted in each frame of picture for prevention of any reduction in the picture quality. This allows a recording circuit 46, which is coupled to the output of the memory circuit 44 for encoding the input digital signals for optimum recording, to process either the HD and SD signals without altering its procedure. The recording circuit 46 is adapted for performing, for example, both error correction coding and modulation coding. Also, known high efficiency encoding in which a redundancy of picture is eliminated and thus, the data to be recorded is decreased, may be carried out for the purpose of increasing the recording time.

In any case, the output of the recording circuit 46 is transmitted through an amplifier 29 and recorded by magnetic heads 24a and 24b onto a magnetic recording tape 28. If the recording density is unfavorably low, it will be necessary to divide the output signal of the recording circuit 46 into a plurality of segments for recording at separate locations. A switch control circuit 47 is provided for delivery, as a primary task, of switch commands to the switch 43 corresponding to a recording mode selected by an operator from three different modes: single-channel HD signal recording, single-channel SD signal recording, and multi-channel SD signal recording. The secondary task of the switch control circuit 47 is to produce switch signals for selectively connecting the switches 45a to 45d in accordance with sync signals derived from their respective digital SD signals to be recorded. In particular, the sync signals are used for controlling the timing Of processing the SD signals respectively. For the purpose, the sync signal generates e.g. an instruction pulse for prohibiting the writing of unnecessary data about horizontal/vertical synchronism into the memory circuit 44.

Figure 4:
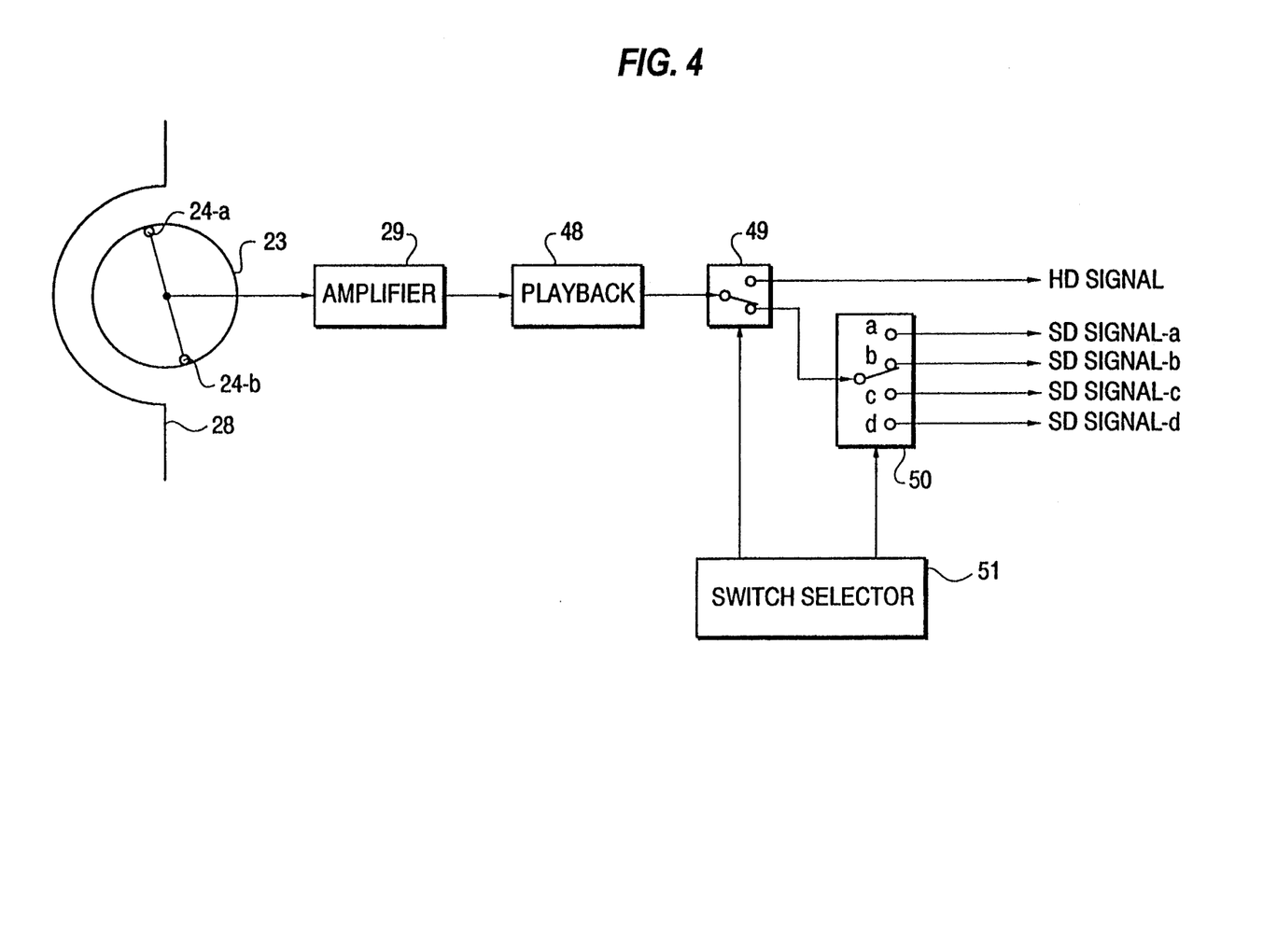
FIG. 4 is a block diagram showing a playback circuit of the second embodiment.

A circuitry arrangement for reproducing original video signals from the foregoing recorded signals will now be described referring to the block diagram of FIG. 4. As shown, a playback circuit 48 performs a reverse of the operation of recording circuit 46 shown in FIG. 3. More specifically, code words of the recorded data carried on the playback signal retrieved from the magnetic recording tape 28 are decoded to an unscrambled form which is then processed by error correction. This series of procedures can be conducted by known techniques. If the data has been high efficiency encoded during recording, its high efficiency code form is encoded to an image data. The decoded data of an HD signal from the playback circuit 48 is transferred though a switch 49 directly to the output for reproduction of the original HD signal. The decoded data of SD signals from the playback circuit 48 is transferred though the switch 49 further to a switch 50 where it is divided into four of the original SD signals.

Identification codes contained in the decoded data from the playback circuit 48 are fed to a switch selector circuit 51 where each of them is examined to determine whether its corresponding data is an HD or SD signal. The resultant signals are then transmitted to the switch 49 which in turn passes the decoded output of the HD signal from the playback circuit 48 directly to the output and the data of the SD signal to the switch 50 while their identification codes are identified respectively. Also, a selection signal from the switch selector circuit 51 is fed to the switch 50 for switching action at a speed of 4 times the processing speed of the SD signal. Accordingly, the four outputs 50a to 50d of the switch 50 can deliver their respective SD signals individually. The two switches 49 and 50 and the selector 51 constitute in combination a signal output route selecting means.

Although the second embodiment explains a procedure of recording, it will be appropriated with equal success in transmission of signals. In fact, it can be explained by replacing the word "record" with "transmission" without dismissing the spirit of the present invention.

For recording one SD signal throughout an extended period of time, the speed of signal processing in a circuit is determined to a rate for processing one SD signal and also, the speed of tape feeding is reduced to ¼. This can easily be executed by known techniques. According to the present invention, the potential capability of any HDVCR will be optimized. More particularly, a variety of signals can be recorded and also, the number of SD signals for simultaneous recording and their recording duration will arbitrarily be determined as compared with the prior art.

Embodiment 3

Figure 5:
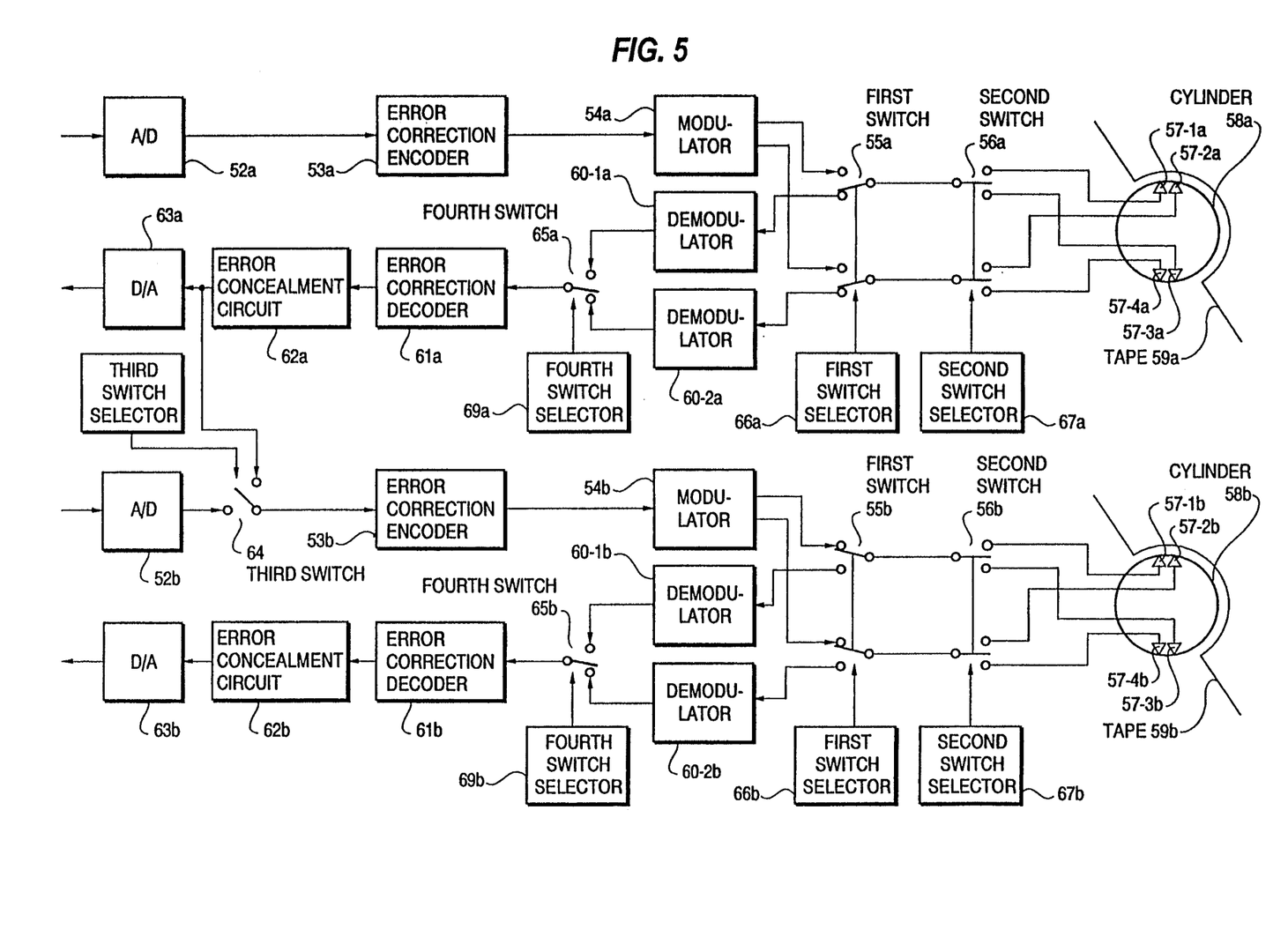
FIG. 5 is a block diagram showing a dubbing circuit of a third embodiment of the present invention.
Figure 6:
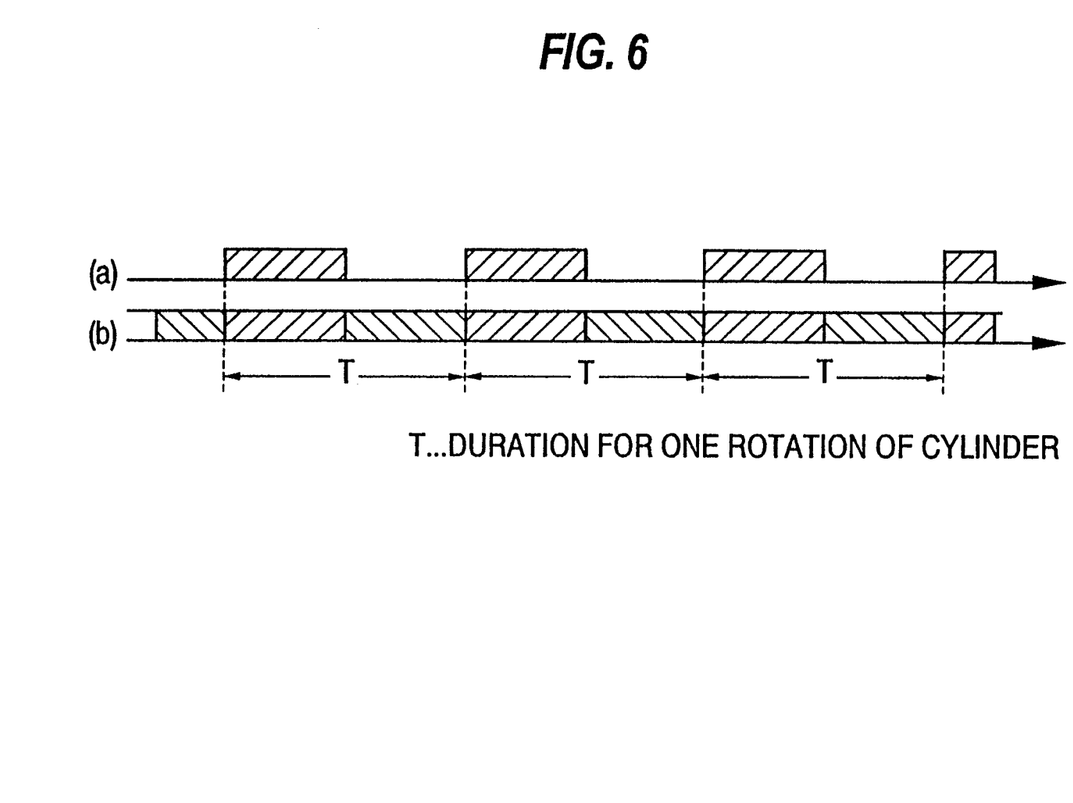
FIG. 6 is a timing chart diagram associated with the third embodiment.

FIG. 5 is a block diagram of a dubbing circuit in a digital VCR showing a third embodiment of the present invention. FIG. 6 illustrates a timing chart diagram associated with signal processing in the dubbing circuit. The circuit shown in FIG. 5 includes: A/D converters 52a and 52b, error correction encoders 52a and 53b, modulators 54a and 54b, first switches 55a and 55b, second switches 56a and 56b, magnetic heads 57-1a, 57-2a, 57-2a, 57-4a, 57-1b, 57-2b, 57-3b, and 57-4b, cylinders 58a and 58b, magnetic recording tapes 59a and 59b, demodulators 60-1a, 60-2a, 60-1b, and 60-2b, error correction decoders 61a and 61b, error concealment circuits 62a and 62b, D/A converters 63a and 63b, a third switch 64, fourth switches 65a and 65b, first switch selectors 66a and 66b, second switch selectors 67a and 67b, third switch selectors 68a and 68b, and fourth switch selectors 69a and 69b.

The operation of the foregoing arrangement in the digital VCR will be described in which for example, the data of an HD signal is equal to two times the data of an SD signal. It is also assumed that the SD signal is recorded by means of a pair of the magnetic heads 57-1a and 57-2a (or 57-1b and 57-2b) and the SD signals are recorded by means of two pairs of the magnetic heads 51-1a, 51-2a, 57-3a, and 57-4a (or 57-1b, 57-2b, 57-3b, and 57-4b). During recording, the rotating speed of the cylinder 58a (or 58b) shows no difference between HD signals and SD signals while the tape feeding speed for recording HD signals is two times that for recording SD signals. More specifically, the recording time of SD signals becomes two times that of HD signals using a given length of the magnetic recording tape 59a (or 59b). Both the HD and SD signals can be recorded in the same form on tracks of the tape 59a (or 59b).

The operation of the third embodiment is described as follows. Each input SD signal is converted by the A/D converter 52a to a digital form which is then processed by error correction encoding with the error correction encoder 53a. The resultant coded SD signal is modulated by the modulator 54a and delivered in two channels to the first switch 55a which is connected for recording. Using the second switch 56a, two channels of the SD signal are recorded onto a recording tape by the two magnetic heads 57-1a and 57-2a or 57-3a and 57-4a with the other pair being inactivated. If the tape loading angle on the cylinder 58a is 180°, the output from the modulator 54a becomes eligible at equal intervals as shown by wave form (a) in FIG. 6. An HD signal is also processed by the A/D converter 52a, the error correction encoder 53a, and the modulator 54a similar to the SD signal, and delivered to the switch 55a which is connected for recording. The HD signal is then recorded to the tape by the two magnetic heads 57-1a and 57-2a or 57-3a and 57-4a, any pair heads being selected by action of the second switch 56a.

If the tape loading angle is also 180°, two outputs of the modulator 54a appear as shown by wave form in FIG. 6(b). For playback of such recorded signals in common operation, the SD signals are retrieved by the two magnetic heads 57-1a and 57-2a 57-2a or 57-3a and 57-4a selected by the second switch 56a while the first switch 55a is connected for playback. Although the other record/playback apparatus is not needed for operation, both the apparatuses may be actuated at the same time for twice repeating a playback action on the magnetic recording tape 59a so that the quality of reproduced data is enhanced.) When the tape loading angle is 180°, each of the two demodulators 60-1a and 60-2a receives an intermittent input shown by wave form (a) in FIG. 6. Also, the HD signal is retrieved by the two magnetic heads 57-1a and 57-2a or 57-3a and 57-4a selected by the second switch 56a while the first switch 55a is connected for playback. When the tape loading angle is 180°, each of the two demodulators 60-1a and 60-2a receives a continuous succession of inputs shown by wave form (b) in FIG. 6. The output of the demodulator 60-1a or 60-2a is error corrected by the error correction decoder 61a and transferred to the error concealment circuit 62a where an uncorrected error data is replaced by a quasi-data generated from its proximate data in accordance with the principle of data correlation. Then, the decoded signal of error corrected and concealed data is converted by the D/A converter 63a to an analog form which is in turn delivered as a common analog video signal.

For dubbing the SD signals at a tape running speed of two times the normal playback speed, thus decreasing the dubbing time by half, a pair of corresponding SD signals retrieved from the magnetic recording tape 59a are processed in the same manner as of playback of the HD signal. While the first switch 55a is connected for playback, the second switch 56a is controlled for selecting the two magnetic heads 57-1a and 57-2a or 57-3a and 57-4a for playback operation. Then, the two retrieved signals are demodulated by their respective demodulators 60-1a and 60-2a. The demodulated signals are then error corrected by the error correction decoder 61a and its uncorrected portion is replaced by a like data at the error concealment circuit 62a. As the error concealment circuit 62a performs substitution by a data portion provided proximate in space and time to the uncorrected error portion whose recorded location on the tape is different between the two, HD and SD, signals, this procedure should be executed on the basis of SD signal processing. The resultant SD signal is designated as an output for dubbing operation. The dubbing output from the error concealment circuit 62a is further transferred to the third switch 64 which in turn disconnects an input from the A/D converter 52b and passes the dubbing output to the error correction encoder 53b for error correction encoding. The output of the error correction encoder 53b is then modulated by the modulator 54b.

In a similar manner to that of the HD signal, the first switch 55b is connected for recording and the two magnetic heads 57-1b and 57-2b or 57-3b and 57-4b selected by the second switch 56b are actuated for dubbing of the SD signals onto the magnetic recording tape 59b. The fourth switch 69a is provided for separating the error correction encoded data into two channels. On the contrary, the fourth switch 69b is for combining two reproduced data to one signal. Such a parallel recording technique is necessary for producing a stable playback output while avoiding excessively high density in the recording.

The first switch selector 66a is provided for controlling the switching action of the first switch 55a so that in response to record/playback instructions given by an operator, an output of the modulator 54a is transmitted to the second switch 56a during recording and two discrete outputs of the second switch 56a are fed to their respective demodulators 60-1a and 60-2a during playback operation. Similarly, the first switch selector 66b is provided for controlling the switching action of the first switch 55b so that in response to record/playback instructions given by the operator, an output of the modulator 54b is transmitted to the second switch 56b during recording and two discrete outputs of the second switch 56b are fed to their respective demodulators 60-1b and 60-2b during playback operation.

The second switch selector 67a controls the transfer of signals during recording: an output of the first switch 55a is transferred to the two magnetic heads 57-1a and 57-2a or 57-3a and 57-4a whichever come in contact with the running recording tape 59. In common, a switch control signal from each switch selector needs to be synchronized with its corresponding video signal. Hence, it will be generated from a vertical sync signal extracted from the video signal to be recorded or a like signal.

During playback, the second switch selector 67a permits the reverse transfer of signals: playback outputs of the two magnetic heads 57-1a and 57-2a or 57-3a and 57-4a whichever remain in contact with the running recording tape 59 are transferred to the first switch 55a. Similarly, a switch control signal emitted from each switch selector during the playback operation needs to be synchronized with its corresponding video signal to be reproduced and thus, will be generated from a sync signal extracted from the playback signal. The second switch selector 67b is also similar in function to the second switch selector 67a, except that they are installed in different DVTRs.

The third switch selector 64a produces a switch control signal for control of the switching action of the third switch 54 in response to a dubbing instruction given by the operator The fourth switch selector 69a is provided for control of the switching action of the fourth switch 65a so that data outputs of the two demodulators 60-1a and 60-2a can alternately be transferred in succession to the error correction decoder 61a at a speed of two times that of their inputs. Also, the fourth switch selector 69b is provided for control of the switching action of the fourth switch 65b so that data outputs of the two demodulators 60-1b and 60-2b can alternately be transferred in succession to the error correction decoder 61b at a speed of two times that of their inputs.

According to the third embodiment of the present invention, double-speed dubbing can be carried out without difficulty. It is understood that the present invention is not limited to the illustrative circuitry arrangement of the third embodiment and other arrangement will be possible for conducting such double-speed dubbing operation. Also, the head arrangement, tape loading angles, and number of rotations for carrying out a procedure of the .compatible HD/SD signal recording using one single apparatus will arbitrarily be determined. The type and number of recording signals will be selected appropriately. Furthermore, the principles of the present invention will be applied with equal success to not only DVCRs but also other record/playback apparatuses. It is also understood that input signals of high efficiency encoded form can be used without particular extras.

What is claimed is:

1. An apparatus for selectively recording and reproducing a first video signal and a second video signal, the first video signal having a larger amount of data in each frame than the second video signal, said apparatus comprising:

a first receiving means for receiving the first video signal;

a second receiving means for receiving a plurality of channels of signals of the second video signal in parallel;

a selection means for selecting one of output signals of the first and second receiving means and for outputting a selected signal said selection means having a plurality of output ports for outputting the plurality of channels of signals of the second video signal in parallel at the same time from the plurality of output ports when selecting the second video signal outputted from the second receiving means and for dividing the first video signal into a plurality of segments of signals and time-divisionally distributing the plurality of segments of signals of the first signal to respectively output the plurality of segments of signals of the first signal from the plurality of output ports when selecting the first video signal outputted from the first receiving means;

a plurality of encoding means respectively coupled to the plurality of output ports of the selection means for encoding output signals of the plurality of output ports;

a plurality of recording means respectively coupled to the plurality of encoding means for recording output signals of the plurality of encoding means onto a recording medium to form a plurality of record tracks on the recording medium;

a plurality of reproducing means for respectively reproducing the recorded signals from the plurality of recorded tracks;

a plurality of decoding means coupled to the plurality of reproducing means for respectively decoding the reproduced signals from the plurality of reproducing means to obtain a plurality of reproduced video signals; and a selective output means for outputting the plurality of reproduced video signals in parallel at a plurality of output ports when the reproduced video signals are the plurality of channels of signals of the second video signal and for outputting the plurality of reproduced video signals time-divisionally at a single output port when the reproduced video signals are the plurality of segments of signals of the first video signal.

2. An apparatus for selectively recording and reproducing a first video signal and a second video signal, the first video signal having a larger amount of data in each frame than the second video signal, said apparatus comprising:

a first receiving means for receiving the first video signal;

a second receiving means for receiving a plurality of channels of signals of the second video signal in parallel;

a selection means for selecting one of output signals of the first and second receiving means and for outputting a selected signal, said selection means having a single output port for outputting the plurality of channels of signals of the second video signal time-divisionally from the single output port when selecting the output signal of the second receiving means and for outputting the first video signal from the single output port when selecting the output signal of the first receiving means;

an encoding means for encoding the selected signal from the selection means;

a recording means for recording an output of the encoding means onto a recording medium to form a predetermined record pattern on the recording;

a reproducing means for reproducing the recorded signal from the recording medium;

a decoding means for decoding the reproduced signal from the reproducing means to obtain a reproduced video signal; and a selective output means for outputting the reproduced video signal as is at a single output port when the reproduced video signal is the first video signal and for separating the reproduced video signal into a plurality of channels to obtain a plurality of channels of reproduced signals of the second video signal and for respectively outputting the plurality of channels of reproduced signals in parallel at a plurality of output ports when the reproduced video signal is the second video signal.

* * * * *